United States Patent [19]

Kuroda

[11] Patent Number: 5,902,665
[45] Date of Patent: May 11, 1999

[54] GLASS SUBSTRATE FOR MAGNETIC DISKS

[75] Inventor: Yasunao Kuroda, Osaka, Japan

[73] Assignee: Onda Techno, Japan

[21] Appl. No.: 08/920,794

[22] Filed: Aug. 29, 1997

[30] Foreign Application Priority Data

Aug. 30, 1996 [JP] Japan .................................. 8-231145
Aug. 27, 1997 [JP] Japan .................................. 9-231225

[51] Int. Cl.[6] ............................ C03C 3/087; G11B 5/84; G11B 5/74; G11B 5/82
[52] U.S. Cl. .......................... 428/141; 428/410; 428/338; 428/220; 428/64.1; 428/64.2; 428/64.3; 428/64.4; 428/65.3; 428/694 SG; 428/694 TR; 428/694 ST; 501/68; 501/69; 501/70; 369/280; 360/135; 346/137
[58] Field of Search ..................... 428/141, 410, 428/338, 220, 64.1, 64.2, 64.3, 64.4, 65.3, 694 SG, 694 TR, 694 ST; 501/68, 69, 70; 369/280; 360/135; 346/137

[56] References Cited

U.S. PATENT DOCUMENTS

| | | | |
|---|---|---|---|
| 4,671,814 | 6/1987 | Aratani et al. | 65/30.14 |
| 5,028,567 | 7/1991 | Gotoh et al. | 501/10 |
| 5,062,021 | 10/1991 | Ranjan et al. | 360/135 |
| 5,080,948 | 1/1992 | Morita et al. | 428/64 |
| 5,087,481 | 2/1992 | Chen et al. | 427/129 |
| 5,108,781 | 4/1992 | Ranjan et al. | 427/130 |
| 5,128,922 | 7/1992 | Inui et al. | 369/280 |
| 5,268,071 | 12/1993 | Sono et al. | 156/663 |
| 5,476,821 | 12/1995 | Beall et al. | 501/10 |
| 5,532,194 | 7/1996 | Kawashima et al. | 501/9 |
| 5,561,089 | 10/1996 | Ishizaki et al. | 501/10 |
| 5,567,484 | 10/1996 | Baumgart et al. | 427/555 |
| 5,569,518 | 10/1996 | Hayashi | 428/141 |
| 5,580,363 | 12/1996 | Goto et al. | 65/33.1 |
| 5,586,040 | 12/1996 | Baumgart et al. | 360/135 |
| 5,595,768 | 1/1997 | Treves et al. | 425/174.4 |
| 5,595,791 | 1/1997 | Baumgart et al. | 427/554 |
| 5,681,636 | 10/1997 | Marshall | 428/65.3 |
| 5,691,256 | 11/1997 | Taguchi et al. | 501/63 |
| 5,714,207 | 2/1998 | Kuo | 427/555 |
| 5,780,371 | 7/1998 | Rifqi et al. | 501/67 |
| 5,804,520 | 9/1998 | Morinaga et al. | 501/4 |
| 5,853,820 | 12/1998 | Kuo et al. | 427/555 |

FOREIGN PATENT DOCUMENTS 4-311814 11/1992 Japan .
7-182655 7/1995 Japan .
08147687 6/1996 Japan .

OTHER PUBLICATIONS

Hiroshi Tani et al., Japan Tribology Society, Draft Collection of Tribology Meeting at Kanazawa, Oct. 1994, p. 153.

Hirohisa Ishihara et al., "Contact Start/Stop Characteristics on Photolithographic Magnetic Recording Media", *Wear*, vol. 172 (1994), pp. 65–72.

*Primary Examiner*—William P. Watkins, III
*Attorney, Agent, or Firm*—Vidas, Arrett & Steinkraus, P.A.

[57] ABSTRACT

A glass substrate for a magnetic disk of the present invention is one in which a laser beam is irradiated on a magnetic recording surface side thereby forming a large number of protrusions thereon to form texture thereon, each of the protrusions having a convex shape, an optical absorption coefficient of a glass with respect to a wavelength of a laser beam at 266 nm being within a range of 20 to 2000 $mm^{-1}$, the glass having a composition by weight of:

silicon oxide ($SiO_2$): 58 to 66%,
aluminum oxide ($Al_2O_3$): 13 to 19%,
lithium oxide ($Li_2O$): 3 to 4.5%,
sodium oxide ($Na_2O$): 6 to 13%,
potassium oxide ($K_2O$); 0 to 5%,
$R_2O$: 9 to 18% (provided $R_2O=Li_2O+NaO+K_2O$),
magnesium oxide (MgO): 0 to 3.5%,
calcium oxide (CaO): 1 to 7%;
strontium oxide (SrO): 0 to 2%;
barium oxide (BaO): 0 to 2%,
RO: 2 to 10% (provided RO=MgO+CaO+SrO+BaO), and
iron oxide ($Fe_2O_3$): 0.05 to 2%,
titanium oxide ($TiO_2$): 0 to 2%,
cerium oxide($CeO_2$): 0 to 2%, and manganese oxide(MnO): 0 to 1%,
(provided that $Fe_2O_3+TiO_2+CeO_2+MnO=0.05$ to 3%).

20 Claims, 3 Drawing Sheets

GLASS SUBSTRATE FOR MAGNETIC DISKS

BACKGROUND OF THE INVENTION

1. Field of the Invention

This invention relates to a glass substrate for a magnetic disk, and more particularly to a glass substrate of this kind which has a predetermined composition and is formed with protrusions on a surface thereof by irradiating a laser beam on the surface to form texture.

2. Description of the Related Art

In general, a fixed magnetic disk unit employs a mechanism called a CSS (Contact Start Stop) system in which a magnetic head is in contact with a disk surface when the disk is stationary and is brought into sliding contact with the same when the disk is started and stopped.

In the CSS system, to prevent stiction from occurring when the disk is started and stopped as well as to reduce friction which will occur on such occasions, so-called texture, i.e. a suitably finely-roughened surface formed by protruded portions and recessed portions (which may be formed by protruded portions alone) is provided on the disk. The texture is provided on all or part of a main surface of the disk, where a magnetic layer is formed. Assuming that the texture is formed merely on part (CSS zone) of the main surface, the magnetic head is moved to the CSS zone at proper timing when the disk is brought into a CSS operation. Further, when the power is turned off during rotation of the disk, the magnetic head is also moved to the CSS zone.

Particularly, when the texture is formed on part of the main surface, the remaining part can preserve smoothness similar to that of a mirror surface, which enables the magnetic head to be floated at a lower position. Therefore, the partially-formed texture is suitable for increasing the recording density (packing density) of the magnetic disk unit.

For a substrate of this disk, an Al—Mg alloy substrate plated with Ni—P, i.e. a so-called aluminum substrate, has been widely employed. To provide texture on the aluminum substrate, a method of forming concentric scratches on the substrate by using an abrasive tape has been widely in practice. However, this method is difficult to meet the requirements of prevention of stiction and reduction of friction at the same time when a further lower floating position is demanded of the magnetic head.

To solve this problem, various methods have been proposed. U.S. Pat. Nos. 5,062,021 and 5,108,781, for instance, disclose a process of forming pits comprised of recesses and annular projections surrounding the recesses on a surface of a metal of an aluminum substrate so as to reduce stiction. The above two U.S. Patents also disclose a method of generating a required surface roughness by using a Nd:YAG laser.

Further, a glass substrate has more advantageous properties over the aluminum substrate in that a surface of the former can be more easily smoothed by polishing than one of the aluminum substrate, the former is more rigid than the latter assuming that they have an identical thickness, the former has an excellent shock resistance, etc.

The above-mentioned technique of forming texture is more important to the glass substrate since its surface can be easily smoothed.

As the method of forming texture on the glass substrate, there has been proposed one based on irradiation of a laser beam. Japanese Laid-Open Patent Publication (Kokai) No. 4-311814, for instance, discloses a method of forming texture on a glass substrate by irradiating a pulsed laser beam on a back plate from a reverse side of the glass substrate arranged at a predetermined distance from the back plate, thereby causing molten fine particles scattered from the surface of the back plate to collide with a surface of the glass substrate.

Japanese Laid-Open Patent Publication (Kokai) No. 7-182655 discloses a method of forming texture on a brittle material, such as a glass, and describes that it is possible to carry out texture processing on a brittle substrate, such as a glass substrate, which has a thermal shock limitation, by controlling a particle fluence of irradiation energy to a suitable value lower than the thermal shock limitation. Below an energy fluence limitation (thermal shock limitation) at which transition is drastic, the energy fluence of the pulsed laser beam has no influence on the glass substrate or merely forms a bump without causing any damage. In the case of a glass disk having a stress of surface compression, almost all of such a bump is protruded upward from a nominal surface, which is useful in reducing stiction of a data storage disk.

According to the publication, this technique of texture processing is capable of forming texture on a surface of a glass substrate at a low cost with excellent controllability. Further, it is also possible to form texture on a CSS region alone of the glass substrate.

Further, Japanese Laid-Open Patent Publication (Kokai) No. 8-147687 discloses a method of irradiating a pulsed laser beam on an aluminum alloy substrate or a glass substrate with a laser output power of 500 mW or less, over 5 $\mu$sec or shorter per one irradiation, by forming a spot of the laser beam on the irradiated surface, which has a diameter of 5 $\mu$m or smaller and moved at a speed of 1 m/sec or higher, to thereby form protrusions at irradiated portions of the surface of the substrate.

Japanese Laid-open Patent Publication (Kokai) No. 7-182655 describes that a laser beam is employed which has a certain range of an optical transmittance of a laser beam energy pulse against the glass. However, there is no description concerning the relation of the laser beam with a composition of the glass, and still less calculation of the height of protrusions formed on the surface of the glass. Further, as to a wavelength of the laser beam, only a value of 10.6 $\mu$m is disclosed but no other wavelength is mentioned. Therefore, there is no disclosure of a wavelength of the laser beam suitable for attaining provision of a uniform bump by a laser beam at a low output power.

By the way, it is known that in general, in a texture part of the magnetic disk, so long as a ratio of an area of projections of the texture to a total area of the surface of the magnetic disk is identical, projections of the texture each having a smaller diameter, i.e. projections of the texture with smaller space intervals are more suitable for a lubricant to take effect, thereby improving abrasion resistance of the magnetic disk [(1) Hiroshi Tani et al, Japan Tribology Society, Draft Collection of Tribology Meeting at Kanazawa, October, 1994, p. 153; (2) H. Ishihara et. al, "Wear", Vol. 172 (1994) p. 65]. Therefore, it is preferred that each protrusion of the texture has a smaller diameter than one disclosed in an example of Japanese Laid-Open Patent Publication (Kokai) No. 7-182655 (in which each protrusion of texture having a diameter of 30 $\mu$m).

However, in the example disclosed in Japanese Laid-Open Patent Publication (Kokai) No. 7-182655, if the number of apertures for lenses is increased and the diameter of a spot of an irradiated laser beam is reduced, there arises a problem that protrusions of texture formed suffer from an undesired variation in size. Presumably, since the number of apertures for lenses is increased and the diameter of each laser beam is reduced, undulations of the surface of the disk causes the diameter of the spot of each laser beam to vary from area to area of the surface of the disk. Such an undesired variation in diameter of each projection of texture on the disk surface has an adverse effect on CSS characteristics, gliding characteristics, etc. of the disk.

Further, the technique described in Japanese Laid-Open Patent Publication (Kokai) No. 8-147687 has no reference to a relation between the composition of a glass and an optical absorption coefficient of a glass substrate when glass is used as a substrate of a magnetic disk. Therefore, it is impossible to determine a value of the optical absorption coefficient, which is necessary for forming protrusions on the glass substrate with accuracy and efficiency. Moreover, the publication does not contains any suggestion on the relation between the absorption coefficient and the height of projections nor the relation between the absorption coefficient and the output power of a laser beam.

SUMMARY OF THE INVENTION

This invention has been made in view of the problems of the prior art described above and an object thereof is to provide a glass substrate for a magnetic disk, which has an excellent property, such as a high flatness suitable for the magnetic disk, and can be formed with protrusions on a surface thereof by irradiating a laser beam on the surface to thereby form texture thereon. Another object thereof is to provide a glass substrate for a magnetic disk, which can be formed with protrusions with accuracy and makes it possible to calculate an absorption coefficient of a glass and further the height of protrusions with ease, and design texture efficiently.

To attain the above objects, according to a first aspect of the invention, there is provided a glass substrate for a magnetic disk in which a laser beam is irradiated on a magnetic recording surface side thereby forming a large number of protrusions thereon to form texture thereon, each of the protrusions having a convex shape, an optical absorption coefficient of a glass with respect to a wavelength of a laser beam at 266 nm being 20 to 2000 mm$^{-1}$, the glass having a composition in terms of weight of:

silicon oxide (SiO$_2$): 58 to 66%,
aluminum oxide (Al$_2$O$_3$): 13 to 19%,
lithium oxide (Li$_2$O): 3 to 4.5%,
sodium oxide (Na$_2$O): 6 to 13%,
potassium oxide (K$_2$O); 0 to 5%,
R$_2$O: 9 to 18% (provided that R$_2$O=Li$_2$O+Na$_2$O+K$_2$O);
magnesium oxide (MgO): 0 to 3.5%,
calcium oxide (CaO): 1 to 7%;
strontium oxide (SrO): 0 to 2%;
barium oxide (BaO): 0 to 2%,
RO: 2 to 10% (provided that RO=MgO+CaO+SrO+BaO),
iron oxide (Fe$_2$O$_3$): 0.05 to 2%,
titanium oxide (TiO$_2$): 0 to 2%,
cerium oxide (CeO$_2$): 0 to 2%, and
manganese oxide(MnO): 0 to 1% (provided that Fe$_2$O$_3$+TiO$_2$+CeO$_2$+MnO=0.05 to 3%).

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
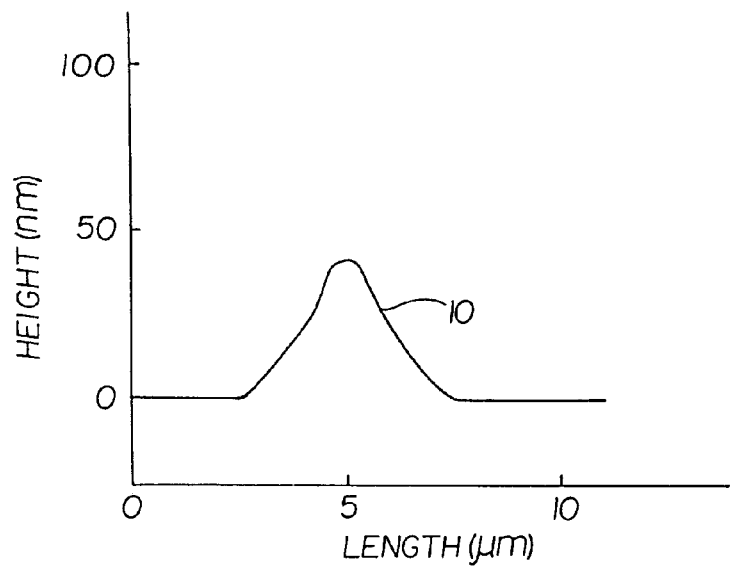
FIG. 1 is an explanatory view of a profile of a convex-shaped protrusion formed by irradiation of a laser beam.

Now, preferred embodiments of the invention will be described in detail.

As a laser beam irradiated on a magnetic recording surface side of a glass substrate, any laser beam may be used so long as the object of the invention can be attained thereby. However, one obtained by a ¼ wavelength conversion of a laser beam generated by a YAG laser is preferably used, since it is possible to easily obtain a high output power, a laser beam-generating device per se is relatively inexpensive, and so forth.

To form desired protrusions as texture on a glass substrate, an optical absorption of a light having a wavelength in a range of ultraviolet rays (1 to 400 nm) is required to be excellent. Texture formed of uniform protrusions can be formed so long as the optical absorption coefficient of a glass e.g. with respect to a wavelength at 266 nm is 20 mm$^{-1}$ or more. To enable a lower output power of a laser beam to be used, the optical absorption coefficient is preferably 50 mm$^{-1}$ or more, and more preferably 100 mm$^{-1}$ or more. Further, to prevent components of a glass from evaporating or to prevent the glass from being broken, the optical absorption coefficient is required to be 2000 mm$^{-1}$ or less, preferably 1000 mm$^{-1}$ or less, and more preferably 300 mm$^{-1}$ or less.

Texture by convex-shaped protrusions may be formed on all over a magnetic recording surface (main surface) of a glass substrate, but it may be partially provided in a predetermined radius range of the main surface. By partially forming protrusions on the main surface, it is possible to maintain a disk surface similar to that of a mirror surface in a radius range other than texture-processed areas, which enables a magnetic head to be floated at a lower position when the disk is made a magnetic disk media, and hence such a partial texture is suitably used for the magnetic disk.

The texture is formed of substantially regularly arranged protrusions each having a convex shape circular in plan view. The protrusions each having a convex shape are preferably spaced by a range of 1 to 100 μm. If the spacing of the protrusions is smaller than 1 μm, it takes a long time period to process texture, which results in a low productivity. On the other hand, if the spacing of the same is larger than 100 μm, the CSS characteristics are degraded. The spacing is more preferably within a range of 2 to 50 μm.

It is preferred that the protrusions each have a height within a range of 5 to 100 nm. If the height is smaller than 5 nm, when the glass substrate is formed into a recording medium, adhesion of the magnetic head to the magnetic medium increases. On the other hand, if the height is larger than 100 nm, when the same is formed into a recording medium, the magnetic head cannot be floated in a sufficiently low position. The height of each protrusion is more preferably within a range of 10 to 50 nm.

It is preferred that the diameter of each convex-shaped protrusion forming texture is within a range of 1 to 20 μm. If the diameter of the protrusion is smaller than 1 μm, it is difficult to form uniform texture in a stable manner. On the other hand, if the diameter of the protrusion exceeds 20 μm, the CSS characteristics are degraded. From viewpoints of the characteristics and productivity, the diameter of each protrusion is more preferably within a range of 1 to 10 μm.

A magnetic disk medium is formed by providing, on the glass substrate, a substrate layer for enhancing magnetic characteristics thereof, a magnetic medium layer, a protective layer, and a lubricating layer, one upon another. For the purposes of further enhancing the magnetic characteristics, increasing an adhesive force, etc., additional intermediate layers may be formed between the glass substrate and the substrate layer.

Next, the composition of the glass forming the glass substrate will be described.

The composition in terms of weight of the glass is: 58 to 66% of silicon oxide ($SiO_2$), 13 to 19% of aluminum oxide ($Al_2O_3$), 3 to 4.5% of lithium oxide ($Li_2O$), 6 to 13% of sodium oxide ($Na_2O$), 0 to 5% of potassium oxide ($K_2O$), and 9 to 18% of $R_2O$ (provided that $R_2O=Li_2O+NaO+K_2O$);

0 to 3.5% of magnesium oxide (MgO), 1 to 7% of calcium oxide (CaO), 0 to 2% of strontium oxide (SrO), 0 to 2% of barium oxide (BaO), 2 to 10% of RO (provided that RO=MgO+CaO+SrO+BaO); and 0.05 to 2% of iron oxide ($Fe_2O_3$), 0 to 2% of titanium oxide ($TiO_2$), 0 to 2% of cerium oxide($CeO_2$), and 0 to 1% of manganese oxide(MnO), (provided that $Fe_2O_3+TiO_2+CeO_2+MnO=0.05$ to 3%).

The glass having such a composition can be manufactured by a floating method, and is low in melting temperature, excellent in water resistance and weather resistance after a reinforcing treatment, and further has an expansion coefficient which permits the glass to be used in combination with a metal product. The floating method is a method of causing a molten glass to flow into a high-temperature bath which holds molten tin therein and has an upper space filled with a reducing atmosphere, from one end thereof, and pulling the glass from another end of the bath to expand the glass into a plate shape. According to the floating method, a glass can be obtained which has opposite surfaces parallel to each other without any distortion but with surface gloss, and it is possible to carry out mass production of the glass. Further, the width of a plate of the glass can be easily changed, and production of the glass can be easily automated.

It is further preferred that the composition by weight of the glass is: 60 to 66% of $SiO_2$, 15 to 18% of $Al_2O_3$, 3 to 4.5% of $Li_2O$, 7.5 to 12.5% of $Na_2O$, 0 to 2% of $K_2O$, and 10.5 to 17% of $R_2O$ (provided that $R_2O=Li_2O+Na_2O+K_2O$);

further, 0.5 to 3% of MgO, 2.5 to 6% of CaO, 0 to 2% of SrO, 0 to 2% of BaO, and 3 to 9% of RO (provided that RO=MgO+CaO+SrO+BaO); and 0.05 to 2% of $Fe_2O_3$; 0 to 2% of $TiO_2$, 0 to 2% of $CeO_2$, and 0 to 1% of MnO (provided that $Fe_2O_3+TiO_2+CeO_2+MnO=0.2$ to 3%).

In the above composition of a glass, $SiO_2$ is a main component essential to the glass. If the content of $SiO_2$ is less than 58 wt %, water resistance of the glass exhibited after an ion exchange is carried out for a reinforcing treatment is degraded, whereas if the same exceeds 66 wt %, viscosity of molten glass becomes too high so that it is difficult to carry out melting and shaping of the glass, and the glass has an excessively low expansion coefficient.

$Al_2O_3$ is a component necessary for increasing an ion exchange rate, and improving the water resistance exhibited after the ion exchange. If the content or $Al_2O_2$ is less than 13 wt %, the effects cannot be obtained sufficiently, whereas if the same exceeds 19 wt %, the viscosity of molten glass becomes too high so that it is difficult to carry out melting and shaping of the glass, and the glass has an excessively low expansion coefficient.

$Li_2O$ is a component essential to carry out the ion exchange, and effective for increasing solubility of the glass. If the content of $Li_2O$ is less than 3 wt %, a sufficient stress of surface compression cannot be obtained after the ion exchange, and the solubility of the glass is low, whereas if the content of the same exceeds 4.5 wt %, the water resistance exhibited after the ion exchange is degraded, and a liquid-phase temperature of the glass becomes higher, which makes it difficult to carry out the shaping of the glass.

$Na_2O$ is a component for increasing the solubility of the glass. If the content of $Na_2O$ is less than 6 wt %, effects thereof are insufficient, whereas if the content of the same exceeds 13 wt %, the water resistance of the glass after the ion exchange is degraded.

$K_2O$ is a component for increasing the solubility of the glass. However, this component is not essential because the stress of surface compression of the glass after the ion exchange is lowered. Therefore, it is preferred that the content thereof is 5 wt % or less.

Further, if the sum of the content of $R_2O=Li_2O+Na_2O+K_2O$ is less than 9 wt %, the viscosity of molten glass becomes so high that it is difficult to carry out melting and shaping of the glass, and the glass has an excessively low expansion coefficient, whereas if the same exceeds 18 wt %, the water resistance of the glass exhibited after the ion exchange is degraded.

MgO is a component for increasing the solubility of the composition, and if the content thereof exceeds 3.5 wt %, the liquid-phase temperature of the glass becomes so high that it is difficult to effect shaping of the glass.

CaO is a component for increasing the solubility of the glass and an essential component for adjusting the ion exchange rate. If the content of CaO is less than 1 wt %, effects thereof are not sufficient, whereas if the same exceeds 7 wt %, the liquid-phase temperature of the glass becomes so high that it is difficult to effect shaping of the glass.

SrO and BaO are components for increasing the solubility and at the same time effective for lowering the liquid-phase temperature of the composition. If the content of these components exceeds 2 wt %, the density of the glass becomes high and the manufacturing costs thereof become high.

Further, it the content of the sum RO=MgO+CaO+SrO+BaO is less than 2 wt %, the viscosity of molten glass becomes so high that it becomes difficult to melt and shape the glass, whereas if the same exceeds 10 wt %, the liquid-phase temperature becomes so high that it is difficult to shape the glass.

In a molten glass, $Fe^{2+}$ and $Fe^{3+}$ of $Fe_2O_3$ are in an equilibrium state, and the transmittance of a light through the molten glass, especially, the transmittance or the light in an infrared region is largely dependent on these ions. If the content of $Fe_2O_3$ less than 0.05 wt %, the transmittance of the light is low and the absorption coefficient of the glass becomes too little. If the content of $Fe_2O_3$ exceeds 2 wt %, the absorption in the infrared region becomes too high, which makes it impossible to control the temperature distribution of the glass when it is melted and shaped, resulting in degraded quality of the glass.

$TiO_2$, $CeO_2$, and MnO are components effective for changing the equilibrium state of $Fe^{2+}$ and $Fe^{3+}$ to thereby change the transmittance of light by mutual interaction. When the content of $TiO_2$ and that of $CeO_2$ each exceeds 2 wt %, or if the content of MnO exceeds 1 wt %, the quality of a glass material is degraded and manufacturing costs of the glass are increased. Furthermore, the content of $Fe_2O_3$+$TiO_2$+$CeO_2$+MnO is less than 0.05%, the absorption coefficient of the glass becomes too little. This content exceeds 3%, the quality of a glass material is degraded.

In the glass having the composition described above, the average coefficient of linear thermal expansion exhibited within a range of 50 to 350° C. is preferably larger than $80 \times 10^{-7}$/K., and more preferably larger than $84 \times 10^{-7}$/K.

The above glass composition does not substantially contain zirconium oxide ($ZrO_2$) for increasing the melting temperature or viscosity thereof. Therefore, it is possible to set the melting temperature (at which a viscosity of $10^2$ noise is exhibited) of the glass composition to 1550° C. or less, and set the working temperature (at which a viscosity of $10^4$ poise is exhibited) of the glass composition to 1100° C. or less, with the liquid-phase temperature being equal to or less than the working temperature. Further, it is preferred that the melting temperature (at which the viscosity of $10^2$ poise is exhibited) of the glass composition is set to 1540° C. or less, and the working temperature (at which the viscosity of $10^4$ poise is exhibited) of the glass composition is set to 1055° C. or less, with the liquid-phase temperature being the working temperature or less. Under such conditions, it is possible to manufacture the glass substrate with ease by the floating method, and obtain a high-quality glass substrate having a high flatness.

It is preferred that the glass is chemically reinforced so as to maintain a strength satisfying the requirement of a magnetic disk substrate. Further, to form each protrusion into a largely convex shape, it is desirable that the glass has a surface subjected to a reinforcing treatment. The reinforcing treatment is carried out by immersing the glass within a molten salt containing monovalent metal ions having a larger ion radius than monovalent metal ions contained in the composition of the glass, thereby causing the ion exchange to be effected between the metal ions within the glass and the metal ions within the molten salt.

For instance, by immersing the glass substrate within a heated solution of potassium nitrate, sodium ions in the vicinity of the surface of the glass substrate are replaced by potassium ions having a larger ion radius than the sodium ions. The resulting stress of compression acts to reinforce the surface of the glass substrate. Further, the glass substrate may be immersed, for example, in a solution of a mixture of silver nitrate (0.5 to 3 wt %) and potassium nitrate (97 to 99.5 wt %) for 30 minutes to one hour or in a solution of a mixture of potassium nitrate (about 60 wt %) and sodium nitrate (about 40 wt %) at around 380° C. for one hour. This causes the silver to quickly permeate into the surface of the glass substrate, thereby promoting the reinforcement of the surface of the glass substrate.

By irradiating a laser beam on a predetermined area of the surface of the glass substrate having the composition described above, it is possible to form protrusions each having a convex shape, e.g. a mountain-like shape or a crator-like shape. When the protrusions are formed, if the output power of the laser beam is low, influence of the output power of the laser beam on the height of protrusions is slight, so that variation in the laser output causes little variation in height of protrusions formed thereby. Therefore, it is preferred that protrusions are formed under a condition of a low laser output power.

To realize a low laser output acting on the surface of the glass substrate, there may be employed a method of increasing an optical absorption coefficient of the glass, i.e. an absorption coefficient of the glass for absorbing part of a laser beam when the laser beam is irradiated to the glass. The optical absorption coefficient of the glass with respect to a wavelength at 266 nm has a linear relation with the transition metal content, particularly, the iron content of the glass. That is, this relationship can be expressed by the following equation:

$$\text{Absorption coefficient (1/mm)} = \alpha \text{ (1/mm·wt \%)} \times \text{iron content (wt \%)}$$

where $\alpha$ represents a proportionality factor.

Figure 3:
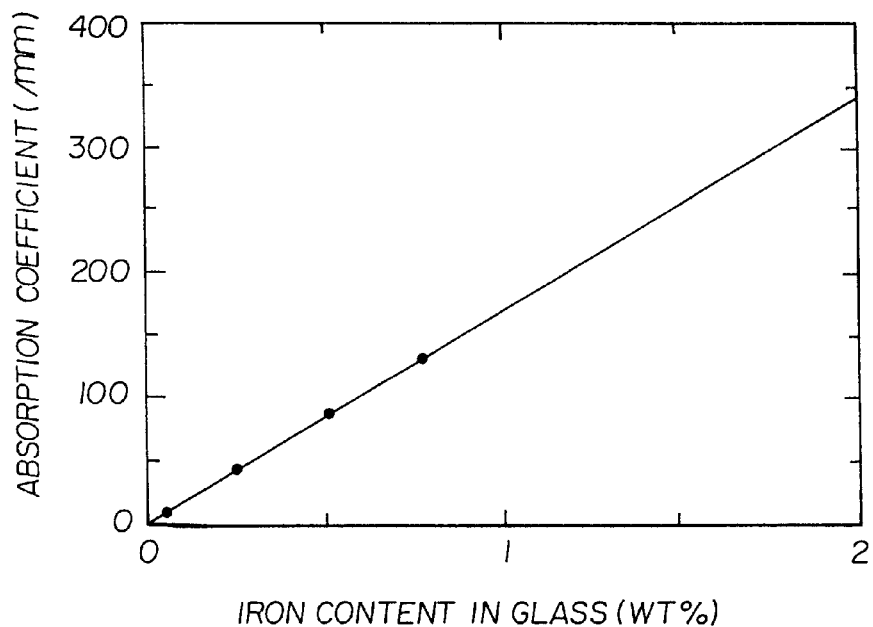
FIG. 3 is a graph showing a relation between the iron content of a glass and the absorption coefficient of the glass.

More specifically, this equation is represented by a straight line e.g. as shown in FIG. 3. In the illustrated case, the proportionality factor $\alpha$ is $1.7 \times 10^2$ (1/mm·wt %).

Further, the height of protrusions forming texture has a linear relation with the absorption coefficient of the glass. This relationship can be expressed by the following equation:

$$\text{Height of a protrusion (nm)} = k \text{ (nm·mm)} \times [\text{absorption coefficient (1/mm)} - \beta]$$

where k represents a proportionality factor, and $\beta$ represents a value of x-intercept when the Y axis represents the height of the protrusion and the X axis represents the absorption coefficient.

The x-intercept of the straight line is $\beta$ (1/mm), and hence if the absorption coefficient of the glass is not more than this value, no protrusion is formed on the surface of the glass substrate. Therefore, it is necessary that the absorption coefficient of the glass>$\beta$ holds.

The proportionality factor k is preferably more than 0 and 3 or less, and more preferably within a range of 1 to 2.5. If the proportionality factor k is excessively small, protrusions suitable for texture cannot be obtained, whereas if the same is excessively large, the protrusions formed becomes too high or the thermal shock limitation of the glass is exceeded.

Further, the value $\beta$ of x-intercept is preferably within a range of 18 to 100.

Figure 4:
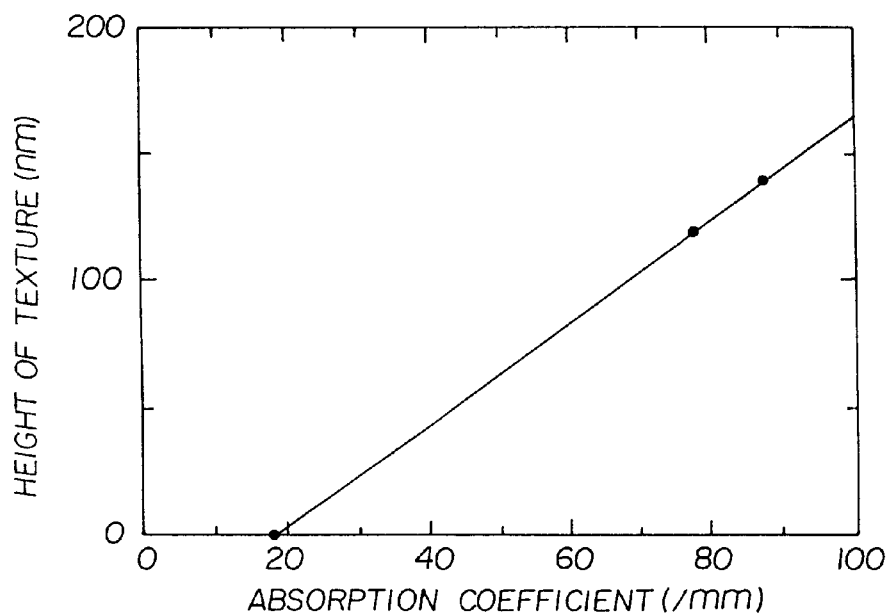
FIG. 4 is a graph showing a relation between the absorption coefficient of the glass and the height of a protrusion.

More specifically, this relationship is represented by a straight line e.g. shown in FIG. 4. In the illustrated case, the proportionality factor k is equal to 2 and the value $\beta$ of x-intercept is equal to 18.

Since the x-intercept of the straight line is equal to 18 (1/mm), if the absorption coefficient of the glass is equal to or less than this value, no protrusions are formed on the surface of the glass substrate. It should be noted that variation in height of the protrusions has a substantially linear relation with variation in the iron content of the glass since the iron content of the glass and the absorption coefficient, and the relation between the absorption coefficient of the glass and the height of protrusions are both linear.

Further, when the absorption coefficient of the glass is made constant, the height of protrusions has an exponential relation with the output power or the laser beam, and this relationship is expressed by the following equation:

Height of a protrusion (nm)=a×exp[γ×output power (mW)]

where a represents a constant, and γ represents a coefficient concerning the output power of the laser beam.

It should be noted that the coefficient γ varies with the composition of the glass, the absorption coefficient, the diameter of a spot of the laser beam, and a pulse width of the laser beam, and the coefficient γ is preferably within a range of 0.4 to 0.6, and further preferably within a range of 0.45 to 0.55. The constant a is preferably within a range of 0.01 to 1.5.

Figure 5:
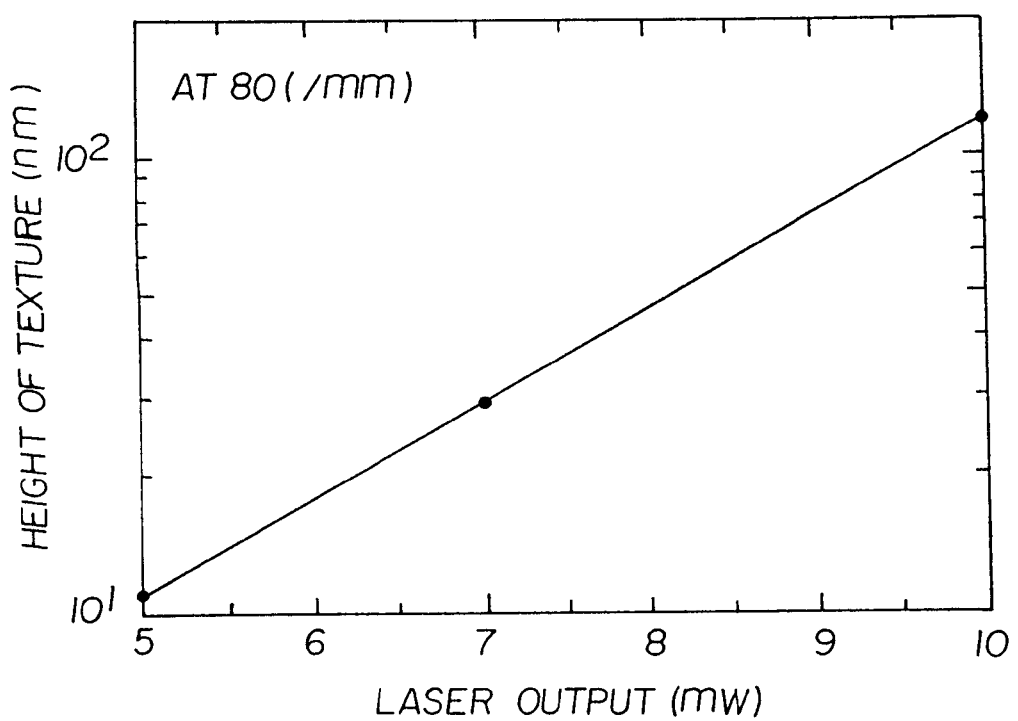
FIG. 5 is a graph showing a relation between the output power of a laser beam and the height of a protrusion.

More specifically, this relation is represented by an exponential function as shown in FIG. 5, assuming that the absorption coefficient is equal to 80 (1/mm), the diameter of an irradiated spot of the laser beam is equal to 10 μm, and the pulse width of the laser beam is equal to 50 ns. In the illustrated case, the constant a is equal to 1, and the coefficient γ is equal to 0.48. It should be noted that this relation holds, provided that the irradiation energy of the laser beam is within a thermal shock limitation of the glass.

Therefore, the composition of the glass and the irradiating conditions of the laser beam can be determined based on these relations in a simplified manner, and texture to be formed on the surface of the glass substrate can be designed with ease.

In addition, to reduce variation in height of protrusions forming the texture, there may be employed a method of lowering the softening temperature of the glass.

As described above, according to the present embodiment, the following advantageous effects can be obtained:

(1) By irradiating a laser beam on a surface of a glass substrate, protrusions having a small diameter can be easily formed with accuracy, to thereby form texture suitable for a substrate of a magnetic disk.

(2) The melting temperature of the glass composition of the invention is low and excellent in shape-forming characteristics, and therefore the glass substrate can be easily manufactured by a floating method. The glass substrate thus obtained is high in quality with a high flatness.

(3) By subjecting the glass substrate to a reinforcing treatment, the resulting glass substrate is made excellent in water resistance and weather resistance, and has an expansion coefficient which permits the glass substrate to be used in combination with a metal product.

(4) The absorption coefficient of the glass with respect to the wavelength at 266 nm of the laser beam can be calculated with ease based on the iron content of the glass.

(5) The height of protrusions can be calculated with ease based on the optical absorption coefficient of the glass, and the texture can be designed efficiently.

(6) The height of protrusions can be calculated with ease based on the output power of the laser beam, and the texture can be designed efficiently.

(7) The proportionality factor k and the value β of x-intercept are set to respective predetermine values so that it is possible to quickly calculate the height of protrusions from the iron content of the glass substrate.

(8) The constant a and the coefficient γ are set to respective predetermined values so that it is possible to quickly calculate the height of protrusions from the output power of the laser beam.

(9) The glass substrate can be reliably formed by a floating method.

EXAMPLES

Now, the invention will be described in further detail based on examples. It should be noted that the invention is not limited to these examples.

Example 1

On a surface of a glass substrate made from a glass having a composition mentioned below, a laser beam is irradiated under the conditions described below so as to form protrusions on the surface of the glass substrate, to thereby form texture thereon.

Figure 2:
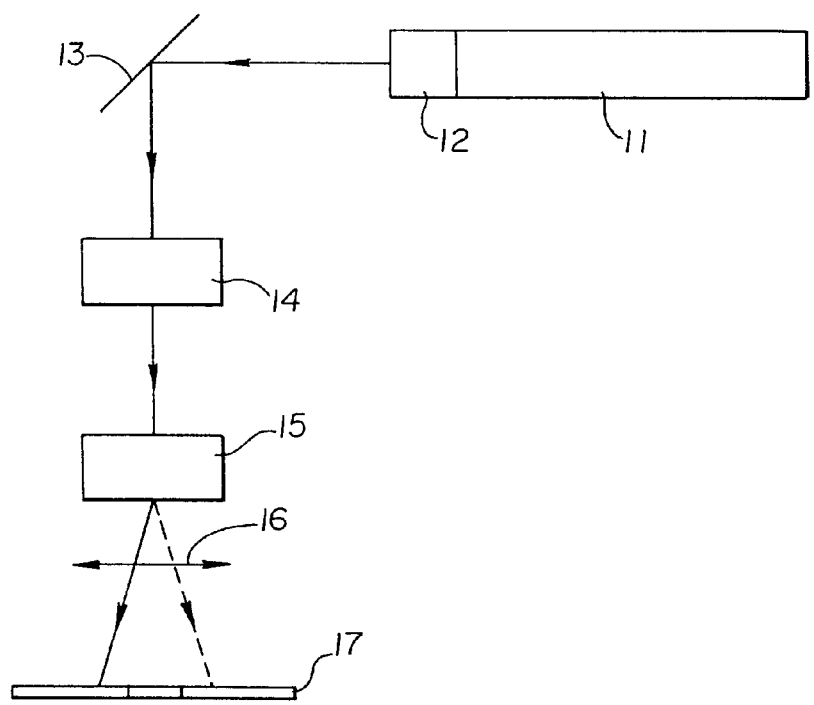
FIG. 2 is a conceptual view or a laser beam irradiating device employed in an embodiment.

More specifically, the texture is formed by using a laser beam-irradiating device shown in FIG. 2. As a laser processing light source 11, a YAG pulsed laser beam is used. An SHG (Secondary Harmonic Generation) element 12 is additionally provided for the light source 11, and converts the laser beam emitted from the light source 11 to a light having a wavelength which is half the original wavelength. A fixed mirror 13 is arranged at a predetermined distance from the SHG element 12, for changing the direction of the laser beam from the SHG element 12.

An FHG (Fourth Harmonic Generation) element 14 is arranged at a predetermined distance from the fixed mirror 13, for further converting the laser beam to a laser beam having a wavelength at 266 nm which is half the wavelength of the laser beam reflected from the fixed mirror 13. A galvanomirror 15 and a condensing lens 16 are arranged below the FHG element 14 for causing the laser beam having the wavelength at 266 nm to be focused at a predetermined position on a glass substrate surface 17.

(1) Composition by wt % of the glass is: 63.4% of $SiO_2$, 16.3% of $Al_2O_3$, 3.7% of $Li_2O$, 10.6% of $Na_2O$, 0.23% of $K_2O$, and 14.53% of $R_2O$ (provided that $R_2O=Li_2O+Na_2O+K_2O$); further, 1.9% of MgO, 3.8% of CaO, and 5.7% of RO (provided that RO=MgO+CaO); and 0.009% of $TiO_2$, and 0.062% of $Fe_2O_3$.

Also, by changing the amount of iron ($Fe_2O_3$) in the composition as shown in TABLE 1 below, glass substrates were prepared in the same manner as mentioned above.

(2) Reinforcing treatment on the glass

The glass substrate having the above composition is immersed in a solution of a mixture of 60 wt % of potassium nitrate ($KNO_3$) and 40 wt % of sodium nitrate ($NaNO_3$), which has been heated up to 380° C. for one hour.

(3) conditions of irradiation or a laser beam
  (i) Laser (basic wave)
    Semiconductor-excited; Nd:YAG pulsed laser; Maximum Power: 2W
  (ii) FHG element
    Conversion efficiency: 3%; Maximum Output Power: 60 mW; Output variation: 2.5%; Energy density; 25 nJ/$\mu m^2$(typ)

As a result, protrusions having a mountain-like shape as shown in FIG. 1 are formed on the surface of the glass. The absorption coefficient of the glass with respect to a wavelength at 266 nm and the content of transition metals, particularly iron ($Fe_2O_3$), contained in the glass exhibited the relation shown in TABLE 1 below.

TABLE 1

| IRON CONTENT (wt %) | ABSORPTION COEFFICIENT (1/mm) |
|---|---|
| 0.062 | 11.7 |
| 0.26 | 46.7 |
| 0.52 | 88.0 |
| 0.78 | 134.5 |

The above results are plotted in FIG. 3. Then, by connecting actually measured points in FIG. 3, a predetermined linear relation was obtained between the iron content and the absorption coefficient of the glass. This straight line can be expressed by the following equation;

$$\text{Absorption coefficient (1/mm)} = 1.7 \times 10^2 \text{ (1/mm·wt \%)} \times \text{iron content (wt \%)}$$

Example 2

In Example 2, the relation between the absorption coefficient of the glass with respect to the wavelength at 266 nm and the height of protrusions is determined under the following conditions:

Diameter of a spot of the irradiated laser beam on a glass substrate surface: 10 μm; Pulse width: 50 ns; Average output power measured by a light power meter using a thermocouple as a sensor: 10 mw As a result, between the absorption coefficient of the glass with respect to the wavelength at 266 nm and the height of protrusions, there was obtained the following relation as shown in TABLE 2 below:

TABLE 2

| ABSORPTION COEFFICIENT (1/mm) | HEIGHT OF PROTRUSIONS (nm) |
|---|---|
| 88 | 140 |
| 78 | 120 |
| 18 | 0 |

The above results are plotted in FIG. 4. Then, by connecting actually measured points in FIG. 4, it was found that there is a predetermined linear relation between the absorption coefficient of the glass and the height of protrusions. A straight line representative of the linear relation can be expressed by the following equation:

$$\text{Height of protrusions (nm)} = 2 \text{ (nm·mm)} \times [\text{Absorption coefficient (1/mm)} - 18]$$

Therefore, to form protrusions having a height of e.g. 1 μinch, i.e. 25.4 nm, from the above equation, it is required to set the absorption coefficient to a value of 30.7 (1/mm). Based on the value of the thus obtained absorption coefficient, from the relationship represented by the equation shown in the Example 1, the iron content ($Fe_2O_3$) of 0.17 (wt %) can be obtained. In this manner, from a desired height of protrusions, the absorption coefficient of the glass is calculated, and then from the absorption coefficient, the iron content of the glass is calculated. Therefore, conditions for designing texture can be easily determined, whereby the texture can be formed efficiently.

Example 3

In this example, the relation between the irradiation energy of a laser beam, i.e. the output power of the laser beam exhibited when the absorption coefficient of the glass is equal to 80 (1/mm) and the height (nm) of protrusions was determined under conditions similar to those of Example 2.

As a result, the relation shown in TABLE 3 below was found between the output power of the laser beam and the height of protrusions:

TABLE 3

| OUTPUT POWER OF LASER BEAM (mW) | HEIGHT OF PROTRUSIONS (nm) |
|---|---|
| 10 | 120 |
| 7 | 28 |
| 5 | 11 |

The results shown in TABLE 3 are plotted in FIG. 5. Then, by connecting actually measured points in FIG. 5, it was found that there is an exponential relation (linear relation in a semi-logarithmic graph) between the output power of the laser beam and the height of protrusions. This relationship can be expressed by the following equation:

$$\text{Height of protrusions (nm)} = \exp[0.48 \times \text{output power (mW)}]$$

Therefore, from a desired height of protrusions, the output power of the laser beam can be calculated, and therefore, it is possible to set the conditions for designing texture, which makes it possible to form texture efficiently.

Example 4

By subjecting the glass substrate having the composition (wt %) shown in Example 1 to lapping and polishing treatments, a glass substrate for a magnetic disk having a disk thickness of 0.635 mm was obtained. This substrate had an outer diameter of 65 mm and an inner diameter of 20 mm. This substrate was subjected to reinforcing treatment and then subjected to precision washing.

Next, this substrate was subjected to texture processing by using a laser texture device used in Example 2. A laser output was controlled by using an optical attenuator so that the height of protrusions became 20 nm. The laser output at this time was actually 7 mW. When the output power is obtained from the equation between the output power of a laser beam and the height of protrusions which is one of the embodiments of the present invention, it is about 6.3 mW which is well accorded with the actual value. A laser condensing diameter at this time is about 10 μm and a texture diameter is 3 μm. After forming the texture, a subbing layer, a magnetic layer and a protective layer were formed. The protective film comprises a carbon film containing 20 wt % of silicone and has a thickness of 16 nm. On the surface of the protective film, a lubricating oil was coated. As the lubricating oil, AM2001 (trade name, available from Montedison Co.) was used and the thickness thereof was 2.3 nm. After coating, the substrate was calcined to heighten a bonding force between the lubricating oil and the surface of the protective film.

The thus prepared media substrate was subjected to a CSS test by using a head having a load of 3.5 gf. Rotation number of the substrate was 4500 rpm, and a spin-up time was made 3 second and a down time 4 second.

According to these conditions, no abnormality was found at the protective film or others even after applying a CSS for 100,000 times. This means that the glass substrate of the present invention has an equal to or more excellent properties than those of a soda lime silicate glass substrate.

Although only one embodiment of the present invention has been described herein, it should be apparent to those skilled in the art that the present invention may be embodied in many other specific forms without departing from the spirit or scope of the invention. Particularly, it should be understood that the invention may be embodied in the following forms besides the above-described embodiment.

It should be noted that the invention may be embodied by modifying the construction of the invention as follows:

(a) Texture on a surface of a glass substrate is formed by a combination of a method using an abrasive film and the method of irradiation of a laser beam.

According to this modification of the invention, it is possible to set the shape of protrusions to a predetermined one, and hence it is possible to effectively prevent the magnetic head from being damaged by striking against a zone-textured portion.

(b) Through control of a repetition frequency of the laser or an attenuator, irradiation energy of the laser beam is progressively reduced from an inner-diameter portion of the glass substrate where a zone-textured portion is formed to an outer-diameter portion of the same where a data portion is formed.

According to this modification, the height of protrusions can be formed in a progressively decreasing manner such that the protrusions are progressively made lower from the zone-textured portion to the data portion.

Therefore, the present examples and embodiment are to be considered as illustrative and not restrictive and the invention is not to be limited to the details given herein, but may he modified within the scope and equivalence of the appended claims.

What is claimed is:

1. A glass substrate for a magnetic disk in which a laser beam is irradiated on a magnetic recording surface side thereby forming a large number of protrusions thereon to form texture thereon, each of said protrusions having a convex shape, an optical absorption coefficient of a glass with respect to a wavelength of a laser beam at 266 nm being within a range of 20 to 2000 mm$^{-1}$, said glass having a composition by weight of:

silicon oxide ($SiO_2$): 58 to 66%,
aluminum oxide ($Al_2O_3$): 13 to 19%,
lithium oxide ($Li_2O$): 3 to 4.5%,
sodium oxide ($Na_2O$): 6 to 13%,
potassium oxide ($K_2O$): 0 to 5%,
$R_2O$: 9 to 18% (provided that $R_2O=Li_2O+Na_2O+K_2O$),
magnesium oxide (MgO): 0 to 3.5%,
calcium oxide (CaO): 1 to 7%;
strontium oxide (SrO): 0 to 2%;
barium oxide (BaO): 0 to 2%,
RO: 2 to 10% (provided that RO=MgO+CaO+SrO+BaO),
iron oxide ($Fe_2O_3$): 0.05 to 2%,
titanium oxide ($TiO_2$): 0 to 2%,
cerium oxide ($CeO_2$): 0 to 2%, and
manganese oxide (MnO): 0 to 1%,
(provided that $Fe_2O_3+TiO_2+CeO_2+MnO=0.05$ to 3%).

2. A glass substrate according to claim 1, wherein said glass has a composition of 60 to 66% of $SiO_2$, 15 to 18% of $Al_2O_3$, 3 to 4.5% of $Li_2O$, 7.5 to 12.5% of $Na_2O$, 0 to 2% of $K_2O$, and 10.5 to 17% of $R_2O$ (provided that $R_2O=Li_2O+Na_2O+K_2O$);

0.5 to 3% of MgO, 2.5 to 6% of CaO, 0 to 2% of SrO, 0 to 2% of BaO, and 3 to 9% of RO (provided that RO=MgO+CaO+SrO+BaO); and 0.05 to 2% of $Fe_2O_3$, 0 to 2% of $TiO_2$, 0 to 2% of $CeO_2$, and 0 to 1% of MnO (provided that $Fe_2O_3+TiO_2+CeO_2+MnO=0.2$ to 3%).

3. A glass substrate according to claim 1, wherein said optical absorption coefficient of said glass is within a range of 50 to 1000 mm$^{-1}$.

4. A glass substrate according to claim 1, wherein said optical absorption coefficient of said glass is within a range of 100 to 300 mm$^{-1}$.

5. A glass substrate according to claim 1, wherein said glass is reinforced, and said optical absorption coefficient of said glass with respect to a wavelength 266 nm of said laser beam has a linear relation with the iron content of said glass, which is expressed by the following relationship:

Absorption coefficient (1/mm)=α(1/mm·wt %)×iron content (wt %)

where α represents a proportionality factor.

6. A glass substrate according to claim 5, wherein said proportionality factor α is equal to $1.7 \times 10^2$ (1/mm·wt %).

7. A glass substrate according to claim 5, wherein said glass is chemically reinforced, and the height of said protrusions has a linear relation with said optical absorption coefficient of said glass, which is expressed by the following relationship:

Height of said protrusions (nm)=k(nm·mm)×[absorption coefficient (1/mm)−β]

where k represents a proportionality factor, and β represents a value of x-intercept exhibited when a Y axis represents the height of said protrusions and an X axis represents said absorption coefficient.

8. A glass substrate according to claim 7, wherein said proportionality factor k is equal to 2, and said value β of said x-intercept is equal to 18.

9. A glass substrate according to claim 1, wherein said glass is chemically reinforced, and the height of said protrusions has an exponential relation with an output power of said laser beam, which is expressed by the following relationship:

Height of said protrusions (nm)=a×exp[γ×output power (mW)]

where a represents a proportionality factor, and γ represents a coefficient concerning said output power of said laser beam.

10. A glass substrate according to claim 9, wherein said constant a is within a range of 0.01 to 1.5, and said coefficient γ is within a range of 0.4 to 0.6.

11. A glass substrate according to claim 9, wherein said constant a is equal to 1, and said coefficient γ is equal to 0.48.

12. A glass substrate according to claim 1, wherein said glass is manufactured by a float process.

13. A glass substrate according to claim 1, wherein the height of said protrusions is within a range of 5 to 100 nm, a diameter of each of said protrusions is in a range of 1 to 20 μm with spacing of said protrusions being 1 to 100 μm.

14. A glass substrate according to claim 1, wherein the height of said protrusions is within a range of 10 to 50 nm, a diameter of each of said protrusions is in a range of 1 to 10 μm with spacing of said protrusions being 2 to 50 μm.

15. A glass substrate according to claim 1, wherein the laser light is YAG pulsed laser.

16. A glass substrate according to claim 1, wherein said composition of said glass has a melting temperature equal to or less than 1550° C., and a working temperature equal to or less than 1100° C.

17. A glass substrate according to claim 1, wherein said melting temperature of said glass composition is equal to or less than 1540° C., and said working temperature is equal to or less than 1055° C.

18. A glass substrate according to claim 5, wherein said reinforcing of said glass is effected by immersing said glass substrate in a heated solution of potassium nitrate.

19. A glass substrate according to claim 5, wherein said reinforcing of said glass is effected by immersing said glass substrate in a solution of a mixture of silver nitrate and potassium nitrate.

20. A glass substrate according to claim 5, wherein said reinforcing of said glass is effected by immersing said glass substrate in a solution of a mixture of potassium nitrate and sodium nitrate.

* * * * *

UNITED STATES PATENT AND TRADEMARK OFFICE
CERTIFICATE OF CORRECTION

PATENT NO.   : 5,902,665
DATED        : May 11, 1999
INVENTOR(S)  : Yasunao Kuroda It is certified that error appears in the above-indentified patent and that said Letters Patent is hereby corrected as shown below:

On the title page, item [73] Assignee, "Onda Techno, Japan" should read --Nippon Sheet Glass Co., Ltd., Japan--.

Col. 7, line 25, "noise" should read --poise--.

Signed and Sealed this

Twenty-third Day of November, 1999

Attest:

Q. TODD DICKINSON

Attesting Officer

Acting Commissioner of Patents and Trademarks